Patented Jan. 18, 1927.

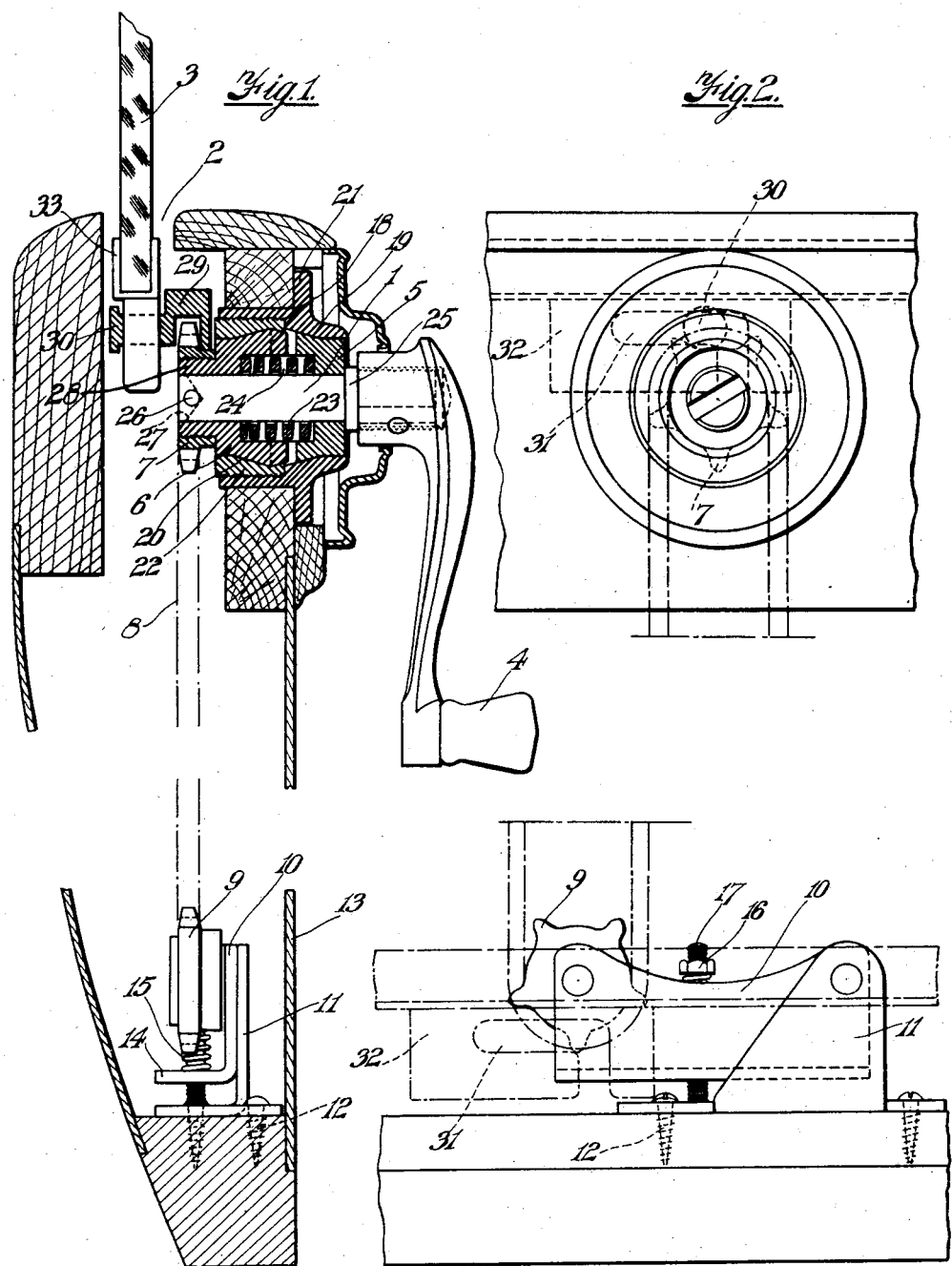

1,614,629

UNITED STATES PATENT OFFICE.

WILLIAM QUICK, OF NORTH EALING, LONDON, SYDNEY EDWARD THOMAS, OF HOUNSLOW, AND FREDERICK WILLIAM BERWICK, OF KENSINGTON, LONDON, ENGLAND.

WINDOW-CONTROL DEVICE.

Application filed October 20, 1925, Serial No. 63,591, and in Great Britain July 28, 1925.

This invention relates to means for raising and lowering windows and has particular although not exclusive reference to the means employed for raising and lowering the windows of automobile and other road vehicles as well as railway and tramway vehicles and ships.

The object of the present invention is to provide an improved device which will enable a window to be adjusted up or down to any desired height and locked automatically against further movement when the desired position is reached, such device being applicable to existing vehicle or other windows.

In the accompanying drawings—

Figure 1 is a vertical sectional elevation showing the application of the invention to an automobile window and Figure 2 is a part side elevation of Figure 1.

In the drawings 1 indicates an operating spindle disposed adjacent an opening 2 in the top of an automobile door or the like through which a window 3 is movable, said operating spindle carrying a handle 4 or hand wheel fixed thereto or the spindle may be so shaped as to allow a handle or the like to be attached or detached at will. Alternatively the operating handle may be foldable into a recess formed in the door or other object in which a window is slidably mounted. A pair of clutch members 5 and 6 is mounted on the spindle 1 in such a manner as to rotate with it but to be slidable longitudinally relatively to the spindle, the clutch member 6 having fixed thereto a sprocket or equivalent wheel 7 over which passes a chain 8, this chain also passing around a second and lower sprocket wheel 9 mounted in a pivoted bearing 10, the supports 11 for which are fixed as shown at 12 into the base of the door or the like 13 in which the window 3 is slidably mounted. Bearing on a laterally extending portion 14 of the pivoted member 10 is a coiled spring 15 the upper end of which bears against a nut 16 on a stud 17 around which the spring is coiled. The tendency of the spring is therefore to force the pivoted member 10 downwardly at its end in which the sprocket 9 is carried, thus maintaining the chain 8 under constant tension.

The two friction clutch members 5 and 6 are of frusto-conical form as shown in Figure 1, their bases being towards one another and preferably engaging by means of diametrically separated dogs 18. The coned surfaces of these clutch members 5 and 6 engage correspondingly coned surfaces 19 and 20 formed on the interior of a housing 21 fixed into the framework 13, the coned surface 20 being preferably formed in a screw threaded ring 22 which is detachable from the member 21 for convenience in assembly. The two clutch members 5 and 6 are normally forced apart into operative engagement with the fixed clutch surfaces 19 and 20 by means of a coiled spring 23 disposed in an annular recess 24 formed within the movable clutch members around the operating spindle 1.

The operating spindle is formed with a collar 25 near its outer end engaging the outer vertical surface of the clutch member 5 whilst the opposite end of the spindle carries a transverse pin 26 the ends of which engage in inclined cam slots 27 formed within a boss 28 of the clutch member 6 which carries the sprocket wheel 7. The effect of this arrangement is that when the operating spindle 1 is rotated the pin 26 travelling along one of the inclined surfaces of the slot 27 forces the two movable clutch members 5 and 6 together against the action of the spring 23. The movable clutch members therefore become disengaged from the fixed clutch surfaces 19 and 20 so that the spindle 1 can be freely rotated and its movement transmitted through the sprocket chain 8 to the window 3 which is raised or lowered according to the direction of rotation imparted to the operating handle 4. When the handle 4 is released however, the spring 23 is free to force the clutch members 5 and 6 apart into engagement with the fixed clutch surfaces 19 and 20 to lock the window against further movement until the handle 4 is again rotated.

It is preferred to connect the chain 8 to the window 3 by means of a member 29 pivotally connected to the chain and having a laterally extending stud 30 adapted to enter a bayonet slot 31 formed in a plate 32 fixed to or forming part of a shoe 33 fixed around the lower edge of the window 3 or fixed to the garnish rail of a frame window. The horizontal portion of the slot 31 allows movement of the stud 30 when that portion of the chain to which it is attached is passing over or beneath the sprocket wheels 7 and 9, and if the device is rotated until the stud 30 is brought to the right hand end of the horizontal slot 31 (Figure 2) the window can be completely removed by forcing it upwardly, allowing the vertical portion of the bayonet slot to pass upwardly around the stud 30.

If desired the device may be constructed with one movable clutch member only, this member having attached to it or formed integral with it the sleeve on which the sprocket wheel or the like is mounted. These clutch members may be formed with conical or flat surfaces plain or serrated in either case.

The invention possesses the advantage that not only is it applicable to existing windows of the kind in which a pane of glass is movable up or down but that the operating device above described can be enclosed completely between the outer and inner panels of a door, vehicle body, wall or partition.

We claim:—

1. In means for raising and lowering windows, a pair of rotary elements, a pair of rotary friction members connected to one of said rotary elements are mounted co-axially therewith, fixed friction surfaces, a spring normally urging said friction members apart and into engagement with said friction surfaces, a hand actuated driving member mounted co-axially with said friction members, and means for drawing said friction members together against the action of said spring upon rotation of the driving member in either direction.

2. In means for raising and lowering a window, an operating shaft, a pair of clutch members slidably mounted on said shaft, a pair of fixed clutch members surrounding said movable clutch members, and means carried by said operating shaft to move the movable clutch members to inoperative position when the shaft is rotated.

3. In means for raising and lowering a window, an operating shaft having lateral projections, a pair of clutch members slidably mounted on said shaft, and a pair of fixed clutch members surrounding said movable clutch members, one of said movable clutch members being formed with cam elements adapted to be engaged by said lateral shaft projections.

In witness whereof we affix our signatures.

WILLIAM QUICK.
SYDNEY EDWARD THOMAS.
FREDERICK WILLIAM BERWICK.